(12) United States Patent
Weber

(10) Patent No.: US 10,006,180 B2
(45) Date of Patent: Jun. 26, 2018

(54) ANIMAL WASTE REMOVAL AND DISPOSAL TOOL

(71) Applicant: Matthew Weber, Montz, LA (US)

(72) Inventor: Matthew Weber, Montz, LA (US)

( * ) Notice: Subject to any disclaimer, the term of this patent is extended or adjusted under 35 U.S.C. 154(b) by 0 days. days.

(21) Appl. No.: 15/476,965

(22) Filed: Mar. 31, 2017

(65) Prior Publication Data

US 2017/0284043 A1    Oct. 5, 2017

Related U.S. Application Data

(60) Provisional application No. 62/315,679, filed on Mar. 31, 2016.

(51) Int. Cl.
| | | |
|---|---|---|
| *E01H 1/12* | (2006.01) | |
| *A01K 1/01* | (2006.01) | |
| *B65F 1/06* | (2006.01) | |

(52) U.S. Cl.
CPC ............. *E01H 1/1206* (2013.01); *A01K 1/01* (2013.01); *B65F 1/062* (2013.01)

(58) Field of Classification Search
CPC .. E01H 1/1206; A01K 23/005; A01K 1/0107; A01B 1/02; A47L 13/52; A01G 1/12
See application file for complete search history.

(56) References Cited

U.S. PATENT DOCUMENTS

| | | | | |
|---|---|---|---|---|
| 4,138,153 A | * | 2/1979 | Brown | E01H 1/1206 15/257.1 |
| 4,149,745 A | * | 4/1979 | Willis | E01H 1/1206 15/257.1 |
| 4,225,169 A | | 9/1980 | DeToma | |
| 5,580,111 A | * | 12/1996 | Bohn | A01K 1/0114 294/1.3 |
| 5,868,447 A | * | 2/1999 | Clark | E01H 1/1206 15/257.3 |
| 6,612,099 B2 | | 9/2003 | Stravitz | |
| 7,077,172 B2 | | 7/2006 | Perkitny | |
| 7,198,310 B1 | | 4/2007 | Lau | |
| 8,177,273 B2 | * | 5/2012 | Santoloci | E04H 4/1609 294/176 |
| 8,955,893 B1 | | 2/2015 | Stern | |
| 9,085,404 B2 | * | 7/2015 | Dunn | B65F 1/062 |
| 9,103,083 B1 | * | 8/2015 | Roland | E01H 1/1206 |
| 2002/0185874 A1 | * | 12/2002 | Arceo | E01H 1/1206 294/1.4 |

* cited by examiner

*Primary Examiner* — Stephen A Vu
(74) *Attorney, Agent, or Firm* — Norton IP Law Firm; Taylor M. Norton

(57) ABSTRACT

Waste clean-up and disposal devices are disclosed for scooping-up, bagging, and disposing of pet waste in a sanitary manner. The device includes a scooper body for removably housing and protecting a flexible tubing dispensing cassette. The scooper body defines a passageway between a waste entrance opening and a waste exit opening. The cassette dispenses flexible tubing from the waste exit opening for receiving waste materials such as pet waste droppings. A blade is preferably connected to the housing for severing of the flexible tubing for disposal.

17 Claims, 10 Drawing Sheets

ANIMAL WASTE REMOVAL AND DISPOSAL TOOL

CROSS REFERENCE TO RELATED APPLICATIONS

This application claims the benefit of U.S. Provisional Application No. 62/315,679, filed on Mar. 31, 2016, which is incorporated herein by reference.

BACKGROUND OF THE INVENTION

Field of the Invention

The present invention generally relates to a scooper device and more particularly relates to a waste scooper and disposal device.

Description of the Related Art

With the growing population of domesticated pets, pet animal owners have the responsibility to timely remove their pet animal waste droppings for reasons of environmental sanitation. The manner in which a person collects such waste needs to be sanitary for reasons of people's health and well-being. Currently, a common method for collecting pet animal droppings is placing waste paper or paper bags over a person's hand and grasping the waste droppings, and then wrapping the droppings and throwing into a garbage can.

Over the years, various devices have been made to assist people with the removal of their pet animal droppings in attempts to protect against the contact and spread of germs. However, such commonly known devices are of complex construction, largely inefficient in operation, and often result in contamination of a person's hands. Handling pet animal droppings in such way is not hygienic or sanitary and can lead to the spreading of unhealthy germs and health concerns. There is a need for a hand-held, sanitary, and portable device for pet owner's to easily and efficiently retrieve and dispose of waste.

A conventional apparatus for picking up animal droppings is provided in U.S. Pat. No. 4,225,169 issued to DeToma, which discloses an umbrella-like mechanical manipulator resemblant of a person's fingers requiring a person to carry individual bags with him or her, to be conscientiously and properly placed over the mechanical fingers on each occasion of use, to position the bag over the fingers to protect against contamination of the mechanical fingers when actuated to pick up the pet droppings. As provided therein, such device requires a person to carry multiple individual bags with him or her when using the device. Such devices are complex in construction and inconvenient in use.

U.S. Pat. No. 7,077,172 issued to Perkitny discloses a waste collection device including a body including a housing with an opening. The opening of the housing allows an open end of an associated bag to be folded thereover, and an internal retractable pulling mechanism is connected to the body and removably connected to the associated bag for selectively pulling the associated bag into the housing. To use, the open end of the bag is positioned adjacent waste material to be collected. The complicated pulling mechanism then pulls the bag into the housing and the waste material is simultaneously transferred into the bag.

U.S. Pat. No. 7,198,310 issued to Lau discloses a device for pet animal droppings collection having a control lever, operating mechanism, spring and pairs of movable parts actuating in a cross-like manner to mimic the grasp of a person's hand. The primary shortcomings are complexity of construction, inconvenience in operation, and hygienic concerns.

More recently, U.S. Pat. No. 8,955,893 issued to Stern discloses an animal waste bucket with a handle. The bucket includes a row of tines at the front entrance to facilitate scooping under the desired object. However, such device requires additional steps to then dispose of the waste which upon scooping merely remains situated in the bucket.

Another type of waste disposal device is a large stationary bucket or container fitted with a bag liner adapted to line the closed interior receiving compartment of the device. U.S. Pat. No. 6,612,099 issued to Stravitz discloses a waste disposal device having a large standing storage container with a removable top cover that can be opened to allow for a person to insert waste from the person's hand into the container. Such devices require the waste to be independently picked up and handled by the person to then be forcibly inserted by the person's hand into the top of the large container, to then be dropped down into the storage compartment. Such devices allow for the storage of waste in a bag and the eventual disposal of the waste, but the waste has already been handled by the person's hands. The mobility of such large heavy standing containers is also limited as they are difficult to maneuver.

While these units may be suitable for the particular purpose employed, they would not be as suitable for the purposes of the present invention as disclosed hereafter.

Accordingly, there is a need for a compact portable lightweight animal waste removal and disposal tool for attending to the cleanup and disposal of animal waste in a more convenient, effective and sanitary manner.

As disclosed in this application, the inventor has discovered novel and unique devices and methods for efficient and sanitary removal and disposal of animal waste, which exhibit superlative properties without being dependent on heavy, immobile, expensive or complex components.

Embodiments of the present invention provide for devices and methods and disclosed herein and as defined in the annexed claims which provide for improved waste removal and disposal features in order to efficiently scoop up and dispose of pet animal droppings of many types from a variety of surfaces, in a sanitary manner, for people's health and well-being.

SUMMARY OF THE INVENTION

It is one prospect of the present invention to provide one or more novel devices of simple but effective construction which can be applied to many environments to efficiently and effectively remove and dispose of pet animal waste.

The following presents a simplified summary of the present disclosure in a simplified form as a prelude to the more detailed description that is presented herein.

Therefore, in accordance with embodiment of the invention, there is provided an animal waste removal and disposal device for scooping up pet waste from a surface and disposing of such waste in a flexible tube which forms a bag to be dropped in the trash. In one embodiment, the device has elongated annular scooper body, which has an annular wall that defines a passageway. The passageway extends from a frontward waste entrance opening to a rearward waste exit opening of the scooper body. The rearward waste exit opening is preferably configured to receive and secure a pleated tubing dispensing cassette. The cassette has an annular cassette body which defines an opening through the cassette, and the opening is sized to closely surround and fit tightly against an outer surface of the annular wall of the waste exit opening of the device. In such preferred embodiment, the annular wall that extends through the cassette provides a slippery guide for waste moving through the passageway of the device and exiting the waste exit opening at the back of the device. In one embodiment, a handle is operatively connected to an outer surface of the elongated annular wall of the scooper body and is configured to be grasped by a user's hand in order to maneuver the device to scoop up waste.

In another embodiment, the annular wall of the scooper body of the waste removal and disposal device is characterized as having a length sufficient to extend fully through the opening of the annular cassette body such that it provides a protective barrier between waste moving through the passageway and exiting the waste exit opening of the device.

In another embodiment, a portion of the scooper body forms a protective guard around the outside of at least a portion of the cassette to provide a barrier between the cassette and the waste when the scooper device is maneuvered across a surface such as grass or a sidewalk to scoop up waste from such surface.

In yet another embodiment, the annular wall of the waste exit opening connects to a radially outwardly extending wall that is preferably at least semi-annular in shape. Such radially outwardly extending wall connects to a rearwardly extending outer annular wall. The outer annular wall is preferably disposed concentric with and relative to the respective inner annular wall of the scooper body. In such embodiment, the outer annular wall, the radially extending wall, and the inner annular wall form a U-shaped channel therebetween, within which a cassette may be installed, at the waste exit opening of the scooper device.

In a preferred embodiment, the backwardly extending annular wall of the waste exit opening includes a top portion relative to a bottom portion, such that the top portion forms a rearwardly extending protrusion relative to the bottom portion. In other words, the top portion extends out further than the bottom portion, to maintain an open passageway for tubing that extends and hangs from the waste exit opening of the scooper device.

In another embodiment, the rearwardly extending outer annular wall contains a blade for severing said tubing. The waste removal and disposal device preferably includes an elongated pole that may be connected to and disconnected from the handle, at the option of the user. In another preferred embodiment, the scooper device includes a row of tines extending forwardly from the annular scooper body at the waste entrance opening.

The waste removal and disposal device is preferably of unitary construction, such that the body is a single piece of a homogenous material, forged from a material selected from a group consisting of plastic, resin, high-density polyethylene, rubber, and steel.

In another preferred embodiment, the waste removal and disposal device further comprises a pleated flexible-tubular film dispensing cassette having an annular shape defining an opening therethrough, and the cassette comprises flexible tubular film within the cassette, such that the flexible tubular film is configured to be dispensed from the cassette by a user pulling one end of the tubular film from a front face of the cassette. Such cassette preferably has a uniform aperture or opening along its front (or back) side from which the tubular film may be pulled.

In one embodiment, the outer periphery of the annular scooper body at the rearward waste exit opening preferably has an outline that is geometrically similar to the outline of the opening of the pleated flexible-tubular film dispensing cassette. Such geometric mating helps keep the cassette firmly engaged with the waste exit opening of the scooper body.

In yet another preferred embodiment, a material scooping device is provided comprising an annular body that is configured to receive a tubing dispensing cassette. The body defines a passageway therethrough and has an upper surface opposite a lower surface, and the lower surface is preferably configured as flat in order to slide along an opposing external flat surface such as a sidewalk or street in order to scoop up material such as dirt, beads, trash and pet waste from such external surface. Such preferred embodiment of the device further includes a tubing dispensing cassette that is operatively connected to the annular body of the scooping device, and the cassette includes a length of pleated flexible tubing contained within it. A handle is preferably fixed to the annular body of the scooping device for maneuvering the body to scoop up the desired material.

The material scooping device preferably forms a protective guard around at least a portion of the tubing dispensing cassette to provide a barrier between the cassette and the material when the scooping device is maneuvered to scoop up material from a surface.

The material scooping device preferably includes a blade for severing flexible tubing material. The material scooping device also preferably includes an elongated pole operatively connected to the handle.

In yet another preferred embodiment, a waste scooper and disposal device is provided comprising a cassette for dispensing a flexible pleated tubing, where the cassette has an annular (ring like) body having a generally U-shaped housing. The annular body has an outer annular wall connecting or transitioning to a radially inwardly extending wall, and the inwardly extending wall connects or transitions to an elongated inner annular wall. In such embodiment, the elongated inner annular wall is characterized as having a sufficient length to sufficiently extend frontally from the U-shaped housing to form a scooper at a distal end thereof, and the scooper at the distal end defines a waste entrance opening configured to scoop up waste from a surface. Opposite the front end of the housing is the back end of the housing, which includes a waste exit opening defined by the housing.

A first portion of the elongated inner annular wall is preferably disposed concentric with the outer annular wall. As the inner annular wall extends frontally from the housing, a top portion of the inner annular wall preferably transitions from a first horizontally disposed axis to a diagonally downwardly sloped longitudinal axis relative to the horizontal, and thence transitions agains to a second horizontally disposed axis which is disposed closer to the bottom portion of the elongated inner annular wall, such that a corresponding second portion of the elongated inner annular wall is not concentric with the outer annular wall. In other words, the second portion of the elongated inner annular wall has a diameter smaller than the diameter of the first portion of the inner annular wall. As noted herein, the distal end of the inner annular wall forms a scooper that defines a waste entrance opening configured to scoop up waste from a surface in embodiments of the invention.

In such preferred embodiment, the waste scooper and disposal device further comprise an annular flange operatively secured to the body to help retain pleated tubing in the U-shaped housing. A handle is preferably fixed to the cassette for maneuvering the device to scoop up said waste from a surface. The waste scooper and disposal device preferably includes pleated tubing within the cassette. In a preferred embodiment, a portion of the tubing is sufficiently drawn frontally from the cassette to extend forward of, out in front of, the distal end scooper, wrap inwardly and backwardly through the scooper, and then extend outwardly from the device. A knot is formed with the tubing for receiving waste preferably and conveniently outside of the device and disposing of the waste that is scooped up by the scooper.

In one embodiment, the housing of the waste scooper and disposal device also includes a blade that is operatively connected to the housing for severing of tubing. The blade is preferably integrated into the housing. The waste scooper and disposal preferably includes an elongated pole operatively connected to the handle for maneuvering the scooper device across a ground surface to scoop up waste material while a user is in a standing position.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which like numerals throughout the figures identify substantially similar components, in which.

DETAILED DESCRIPTION

Figure 1:
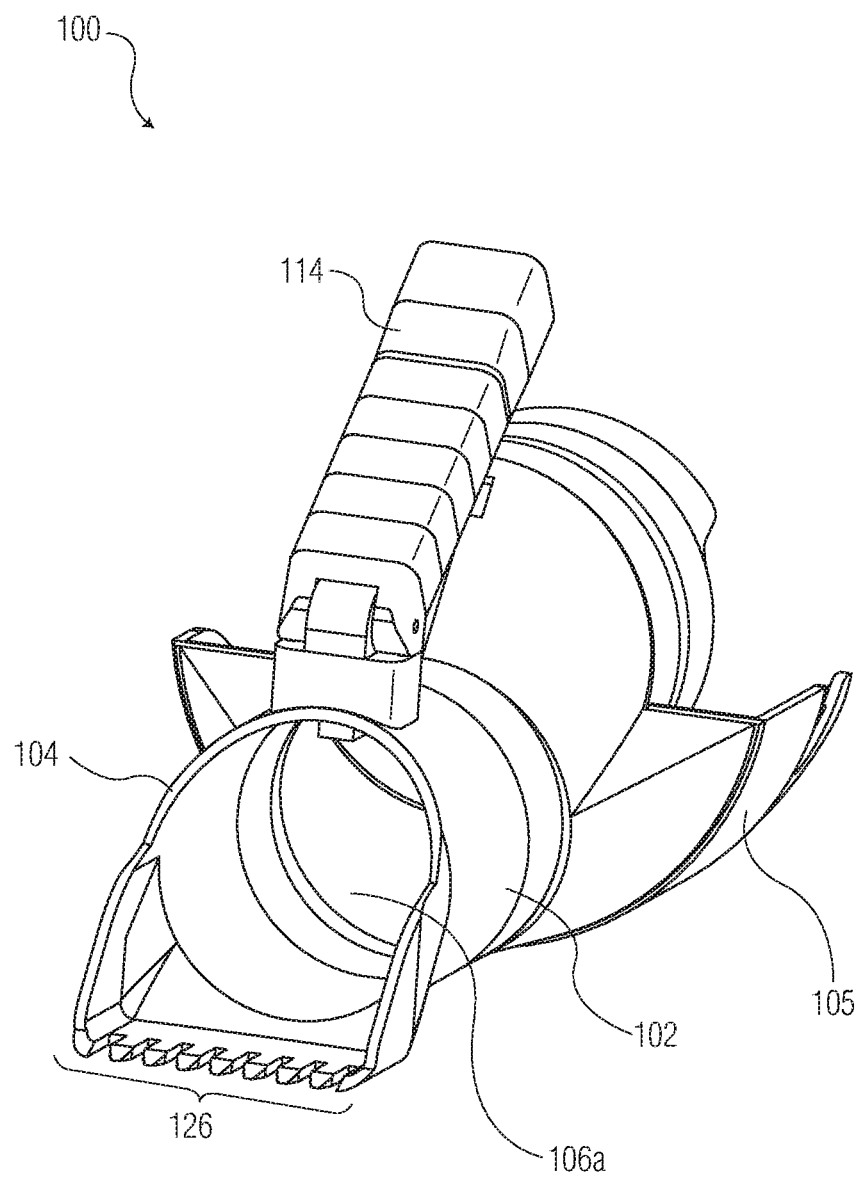
FIG. 1 is a front right perspective view of an exemplary waste removal and disposal device in accordance with an embodiment of the invention.
Figure 2:
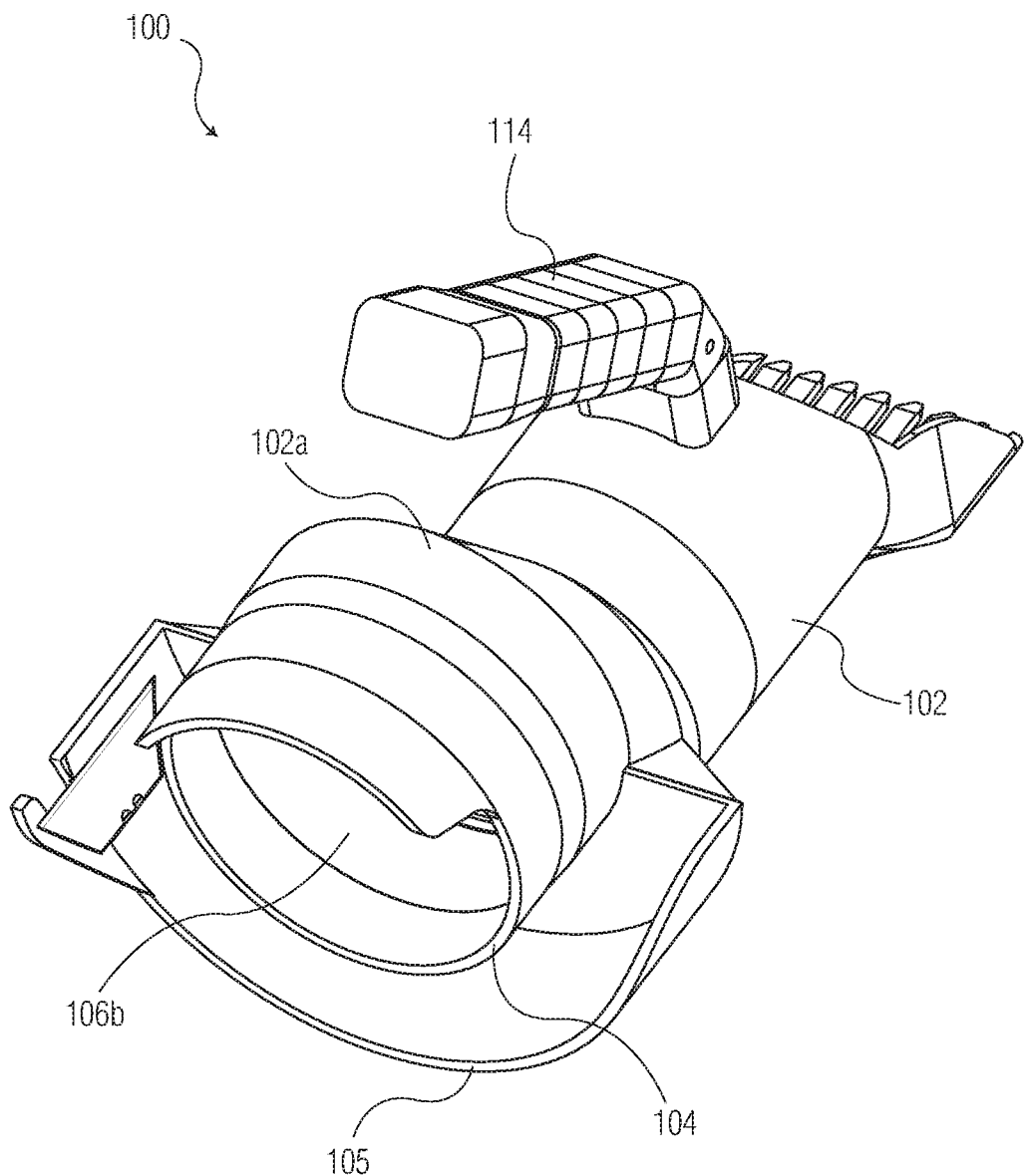
FIG. 2 is a back left perspective view thereof.
Figure 3:
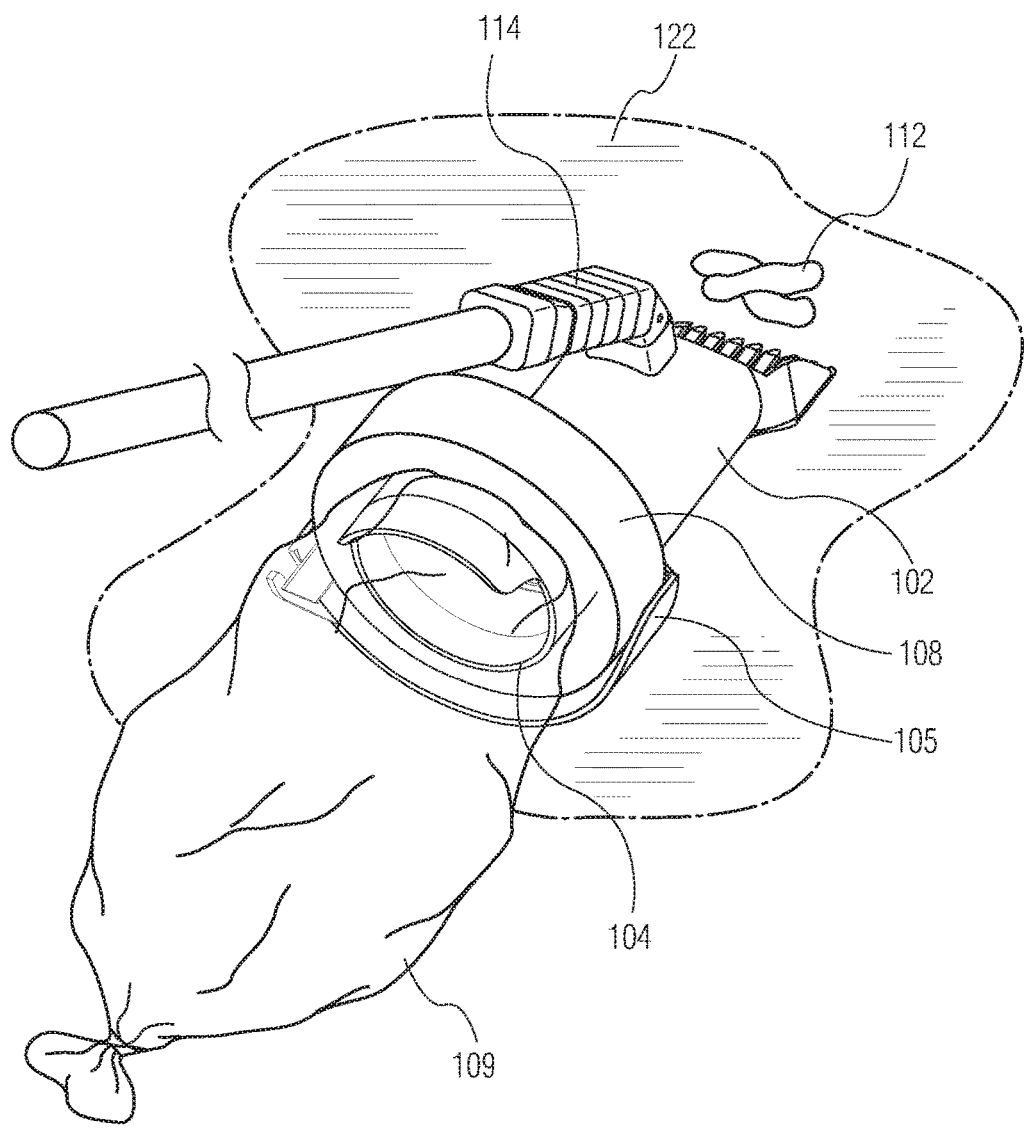
FIG. 3 is a back left perspective of a waste removal and disposal device with a pleated tubing dispensing cassette having tubing extending therefrom in accordance with an embodiment of the invention, and illustrating exemplary waste material on a surface.

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

As used herein, "axis" means a real or imaginary straight line about which a three-dimensional body is symmetrical. A "vertical axis" means an axis perpendicular to the ground (or put another way, an axis extending upwardly and downwardly). A "horizontal axis" means an axis parallel to the ground.

As used herein, homogeneous is defined as the same in all locations, and a homogeneous material is a material of uniform composition throughout that cannot be mechanically separated into different materials. Examples of "homogeneous materials" are certain types of plastics, ceramics, glass, metals, alloys, paper, board, resins, high-density polyethylene and rubber.

In accordance with embodiments of the invention, there is provided an animal waste removal and disposal device for scooping up pet waste from a surface and disposing of such waste in a flexible tube which forms a bag to be dropped in the trash.

Referring initially to FIGS. 1-4, the basic constructional details and principles of operation of one embodiment of an animal waste removal and disposal device 100 according to a preferred embodiment of the present invention will be discussed.

An animal waste removal and disposal device 100 according to a preferred embodiment of the present invention is provided. As illustrated in FIGS. 1-4, the device 100 comprises elongated annular scooper body 102, which has an annular wall 104 that defines a passageway 106. The passageway 106 extends from a frontward waste entrance opening 106a to a rearward waste exit opening 106b of the scooper body 102. The rearward waste exit opening is preferably configured to receive and secure a pleated tubing 109 dispensing cassette 108. The cassette 108 has an annular cassette body which defines an opening 110 through the cassette 108, and the opening 110 is sized to closely surround and fit tightly against an outer surface 104a of the annular wall 104 of the waste exit opening 106b of the device 100. In such preferred embodiment, the annular wall 104 that extends through the cassette provides a slippery guide for waste 112 moving through the passageway of the device and exiting the waste exit opening 106b at the back of the device. In one embodiment, a handle 114 is operatively connected to an outer surface 104a of the elongated annular wall 104 of the scooper body and is configured to be grasped by a user's hand in order to maneuver the device to scoop up waste 112.

In another embodiment, the annular wall of the scooper body 102 of the waste removal and disposal device is characterized as having a length sufficient to extend fully through the opening of the annular cassette body 108 such that it provides a protective barrier between waste 112 moving through the passageway and exiting the waste exit opening of the device.

In another embodiment, a portion of the scooper body forms a protective guard around the outside of at least a portion of the cassette 108 to provide a barrier between the cassette 108 and the waste 112 when the scooper device is maneuvered across a surface such as grass or a sidewalk to scoop up waste 112 from such surface.

The device 100 is designed and configured to operatively receive, hold, and move a pleated tubing dispensing cartridge or cassette 108, thereby allowing waste 112 from a surface 122 to be scooped up and disposed of as flexible tubing 109 is rearwardly drawn away from the waste exit opening 106b of the device 100.

Figure 4:
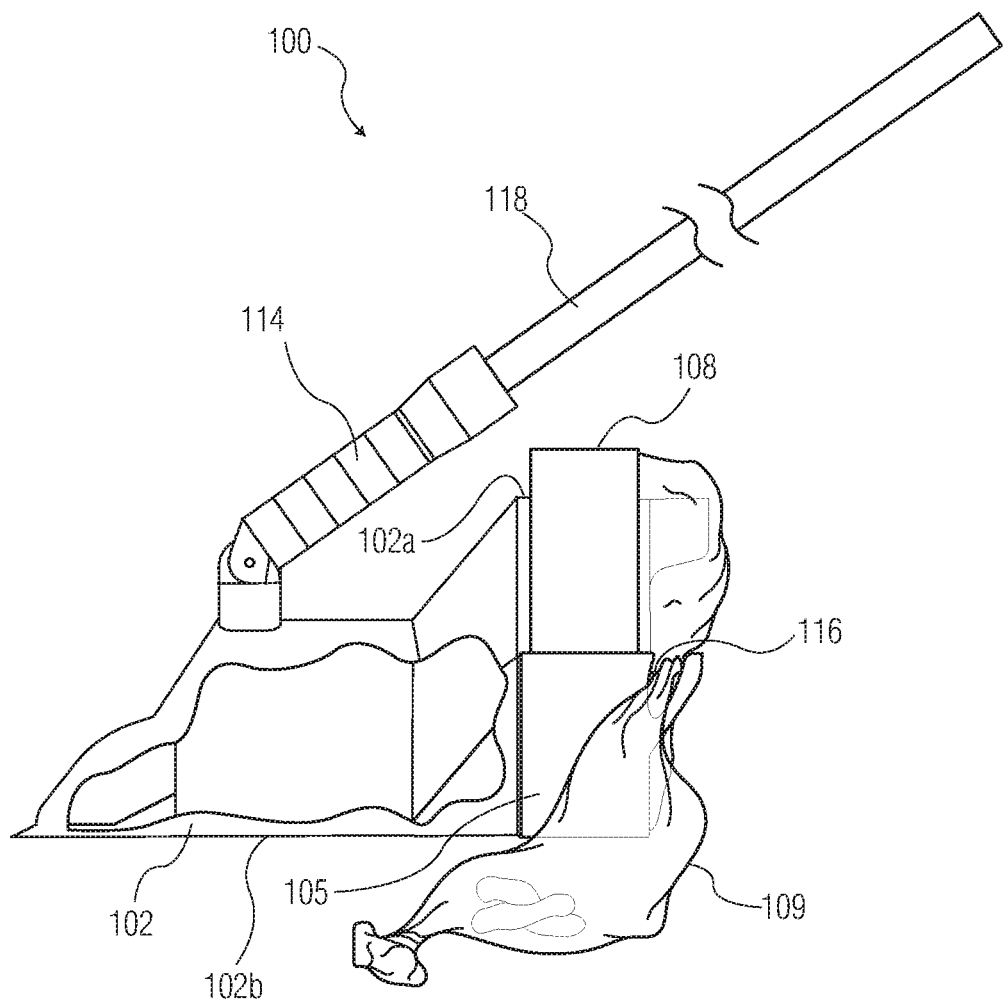
FIG. 4 is a side view, partly in cross section, according to a preferred embodiment of the invention.

Advantageously, in addition to the exemplary pleated tubing dispensing cassette 108 illustrated in FIG. 4, the device 100 is designed and configured, through embodiments disclosed herein, to operatively receive, hold, and move, a variety of other cassettes or cartridges, such as those disclosed in U.S. Pat. No. 9,085,404, U.S. Pat. No. 8,959,880, and U.S. Pat. No. 6,612,099, all of which are incorporated by reference herein.

In yet another embodiment, the annular wall of the waste exit opening 106b connects to a radially outwardly extending wall that is preferably at least semi-annular in shape. Such radially outwardly extending wall connects to a rearwardly extending outer annular wall. The outer annular wall is preferably disposed concentric with and relative to the respective inner annular wall of the scooper body. In such embodiment, the outer annular wall, the radially extending wall, and the inner annular wall form a U-shaped channel therebetween, within which a cassette 108 may be installed, at the waste exit opening of the scooper device.

In a preferred embodiment, the backwardly extending annular wall of the waste exit opening includes a top portion relative to a bottom portion, such that the top portion forms a rearwardly extending protrusion relative to the bottom portion. In other words, the top portion extends out further than the bottom portion, to maintain an open passageway for tubing 109 that extends and hangs from the waste exit opening of the scooper device.

In another embodiment, the rearwardly extending outer annular wall contains a blade 116 for severing said tubing 109. The waste removal and disposal device preferably includes an elongated pole that may be connected to and disconnected from the handle 114, at the option of the user. In another preferred embodiment, the scooper device includes a row of tines 126 extending forwardly from a wide mouth opening of the annular scooper body 102 at the waste entrance opening 106a.

The waste removal and disposal device 100 is preferably of unitary construction, such that the body is a single piece of a homogenous material, forged from a material selected from a group consisting of plastic, resin, high-density polyethylene, rubber, and steel.

In another preferred embodiment, the waste removal and disposal device further comprises a pleated flexible-tubular film dispensing cassette 108 having an annular shape defining an opening therethrough, and the cassette 108 comprises flexible tubular film within the cassette 108, such that the flexible tubular film is configured to be dispensed from the cassette 108 by a user pulling one end of the tubular film from a front face of the cassette 108. Such cassette 108 preferably has a uniform aperture or opening along its front (or back) side from which the tubular film may be pulled.

Figure 5A:
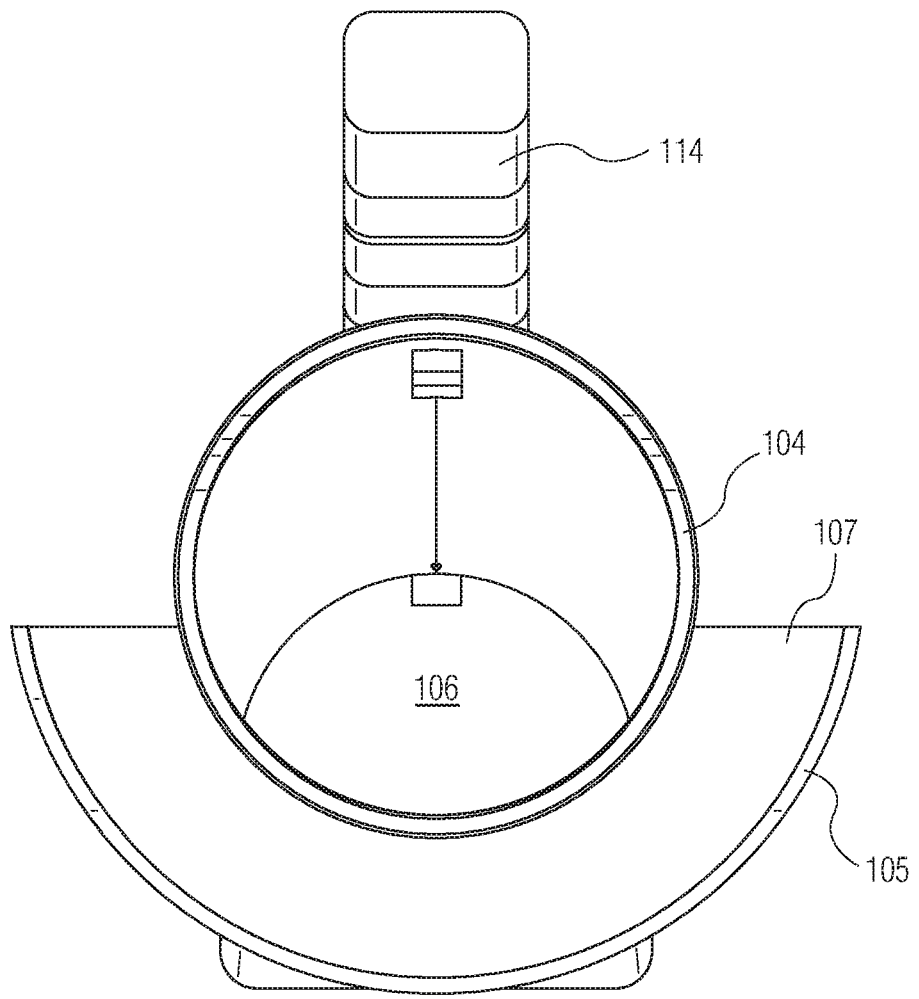
FIG. 5A is a back view of a device according to an embodiment of the invention.
Figure 5B:
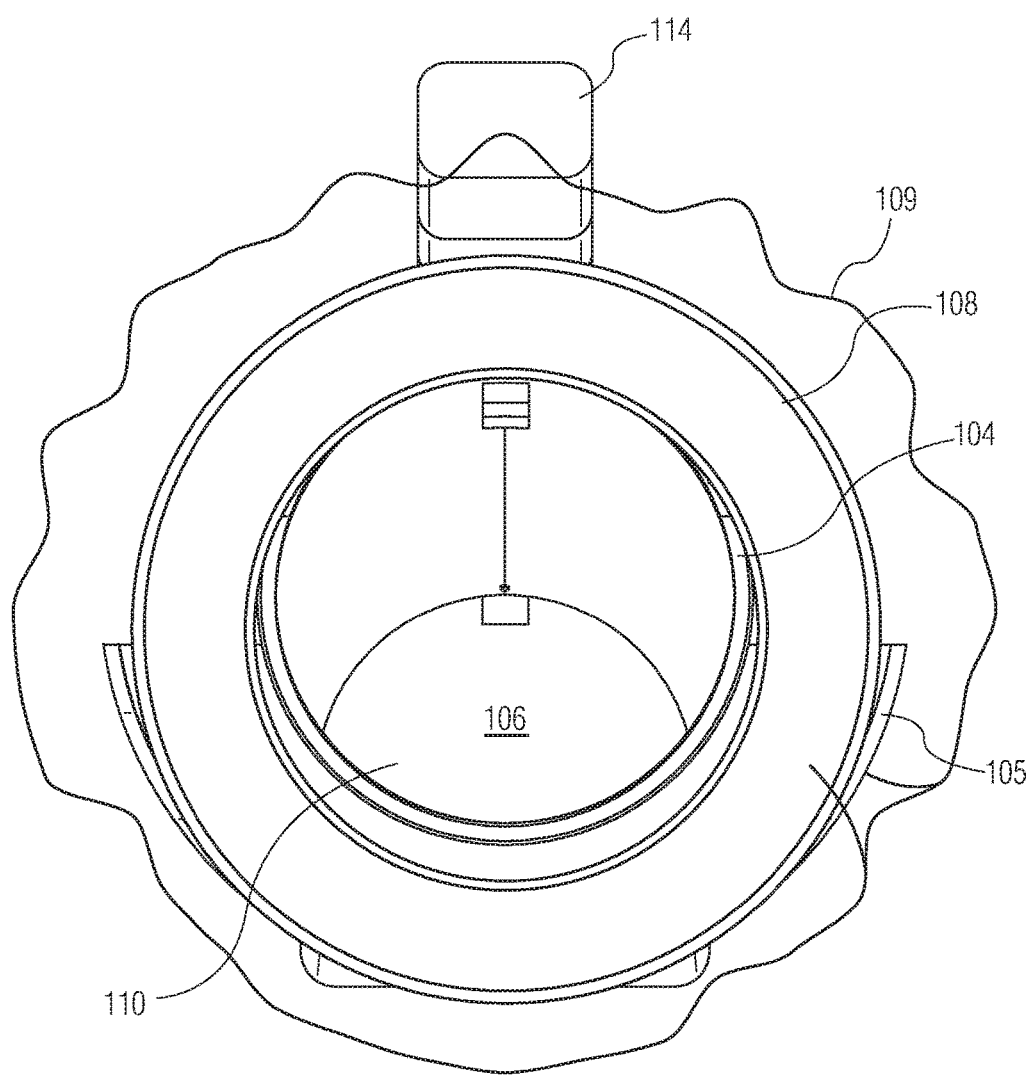
FIG. 5B is a back view of an exemplary embodiment including a cassette according to an embodiment of the invention.
Figure 6:
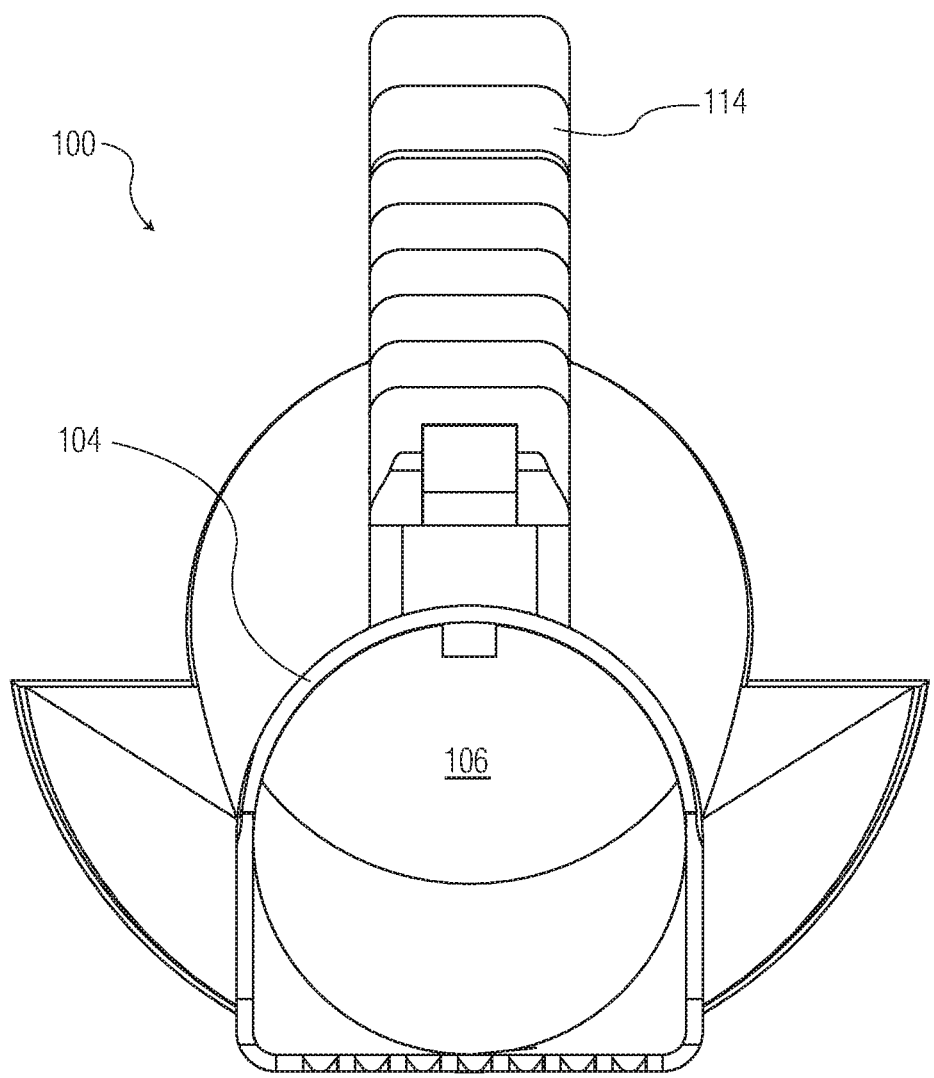
FIG. 6 is a front elevation view of an embodiment of the invention.
Figure 7:
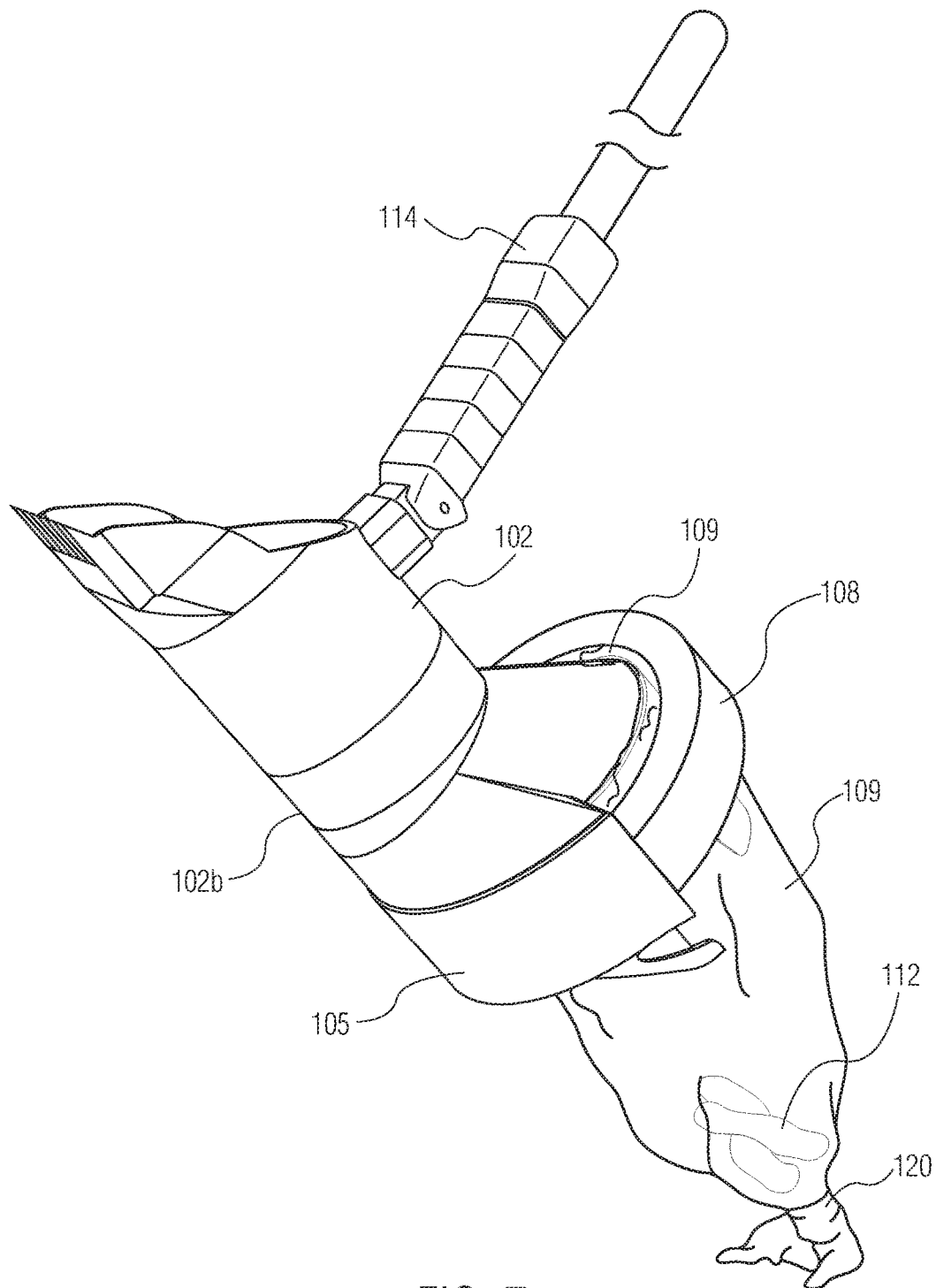
FIG. 7 is a perspective view of an embodiment of the invention.

In one embodiment, the outer periphery of the annular scooper body at the rearward waste exit opening preferably has an outline that is geometrically similar to the outline of the opening of the pleated flexible-tubular film dispensing cassette 108, such as illustrated in FIGS. 5-6. Such geometric mating helps keep the cassette 108 firmly engaged with the waste exit opening of the scooper body 102, as illustrated in FIG. 7.

In yet another preferred embodiment, a material scooping device is provided comprising an annular body 102 that is configured to receive a tubing dispensing cassette 108. The body 102 defines a passageway therethrough and has an upper surface 102a opposite a lower surface 102b, and the lower surface is preferably configured as flat in order to slide along an opposing external flat surface such as a sidewalk or street in order to scoop up material such as dirt, beads, trash and pet waste 112 from such external surface. Such preferred embodiment of the device 100 further includes a tubing dispensing cassette 108 that is operatively connected to the annular body 102 of the scooping device, and the cassette 108 includes a length of pleated flexible tubing 109 contained within it. A handle 114 is preferably fixed to the annular body 102 of the scooping device for maneuvering the body 102 to scoop up the desired material.

The material scooping device 100 preferably forms a protective guard (e.g., numeral 105 in FIGS. 4 and 7) around at least a portion of the tubing dispensing cassette 108 to provide a barrier between the cassette 108 and the material when the scooping device is maneuvered to scoop up material from a surface 122.

The material scooping device preferably includes a blade 116 for severing flexible tubing 109 material. The material scooping device also preferably includes an elongated pole 118 operatively connected to the handle 114.

Figure 8:
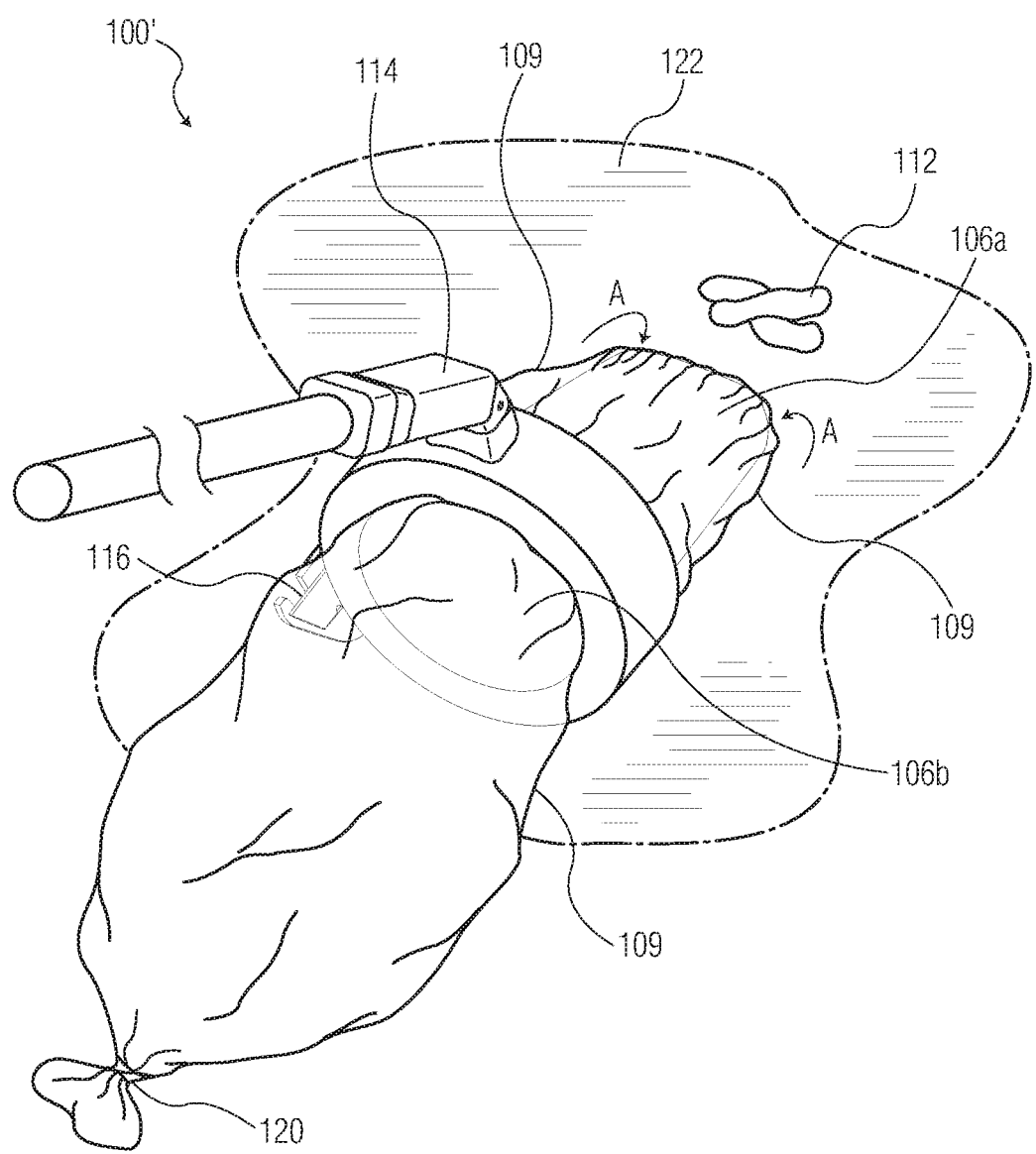
FIG. 8 is a back left perspective view of a waste scooper and disposal device showing exemplary tubing and illustrating exemplary waste material on a surface, according to an embodiment of the invention.
Figure 9:
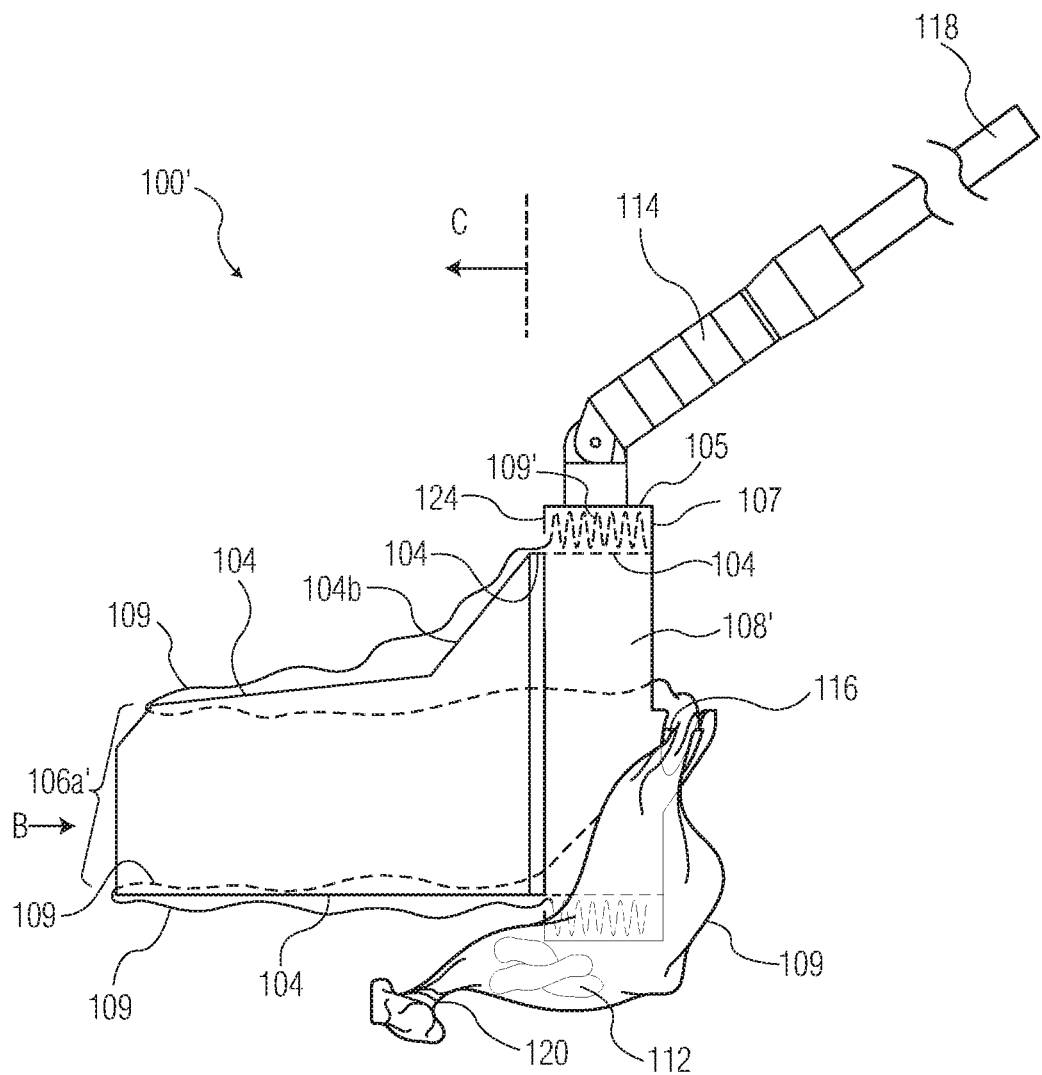
FIG. 9 is a side elevation view thereof in accordance with an embodiment of the invention.

Referring to FIGS. 8 and 9, in yet another preferred embodiment, a waste scooper and disposal device 100' is provided comprising a cassette 108' for dispensing a flexible pleated tubing 109, where the cassette 108' has an annular (ring like) body having a generally U-shaped housing. The annular body 102 has an outer annular wall 105 connecting or transitioning to a radially inwardly extending wall 107, and the inwardly extending wall 107 connects or transitions to an elongated inner annular wall 104. In such embodiment, the elongated inner annular wall 104 is characterized as having a sufficient length to sufficiently extend frontally from the U-shaped housing to form a scooper 106a' at a distal end thereof, and the scooper 106a' at the distal end defines a waste entrance opening configured to scoop up waste 112 from a surface. Opposite the front end of the housing is the back end of the housing, which includes a waste exit opening 106b defined by the housing.

A first portion of the elongated inner annular wall is preferably disposed concentric with the outer annular wall 105. As the inner annular wall 104 extends frontally from the housing, a top portion of the inner annular wall 104 preferably transitions from a first horizontally disposed axis to a diagonally 104b downwardly sloped longitudinal axis relative to the horizontal, and thence transitions again to a second horizontally disposed axis which is disposed closer to the bottom portion of the elongated inner annular wall 104, such that a corresponding second portion of the elongated inner annular wall 104 is not concentric with the outer annular wall 105. In other words, the second portion of the elongated inner annular wall 104 has a diameter smaller than the diameter of the first portion of the inner annular wall 104, as seen in FIG. 9. As noted herein, the distal end of the inner annular wall 104 forms a scooper 106a' that defines a waste entrance opening configured to scoop up waste 112 from a surface in embodiments of the invention.

In such preferred embodiment, the waste scooper and disposal device further comprise an annular flange 124 operatively secured to the body 102 to help retain pleated tubing 109 in the U-shaped housing. A handle 114 is preferably fixed to the cassette 108 for maneuvering the device to scoop up said waste 112 from a surface. The waste scooper and disposal device preferably includes pleated tubing 109' within the cassette 108. In a preferred embodiment, a portion of the tubing 109 is sufficiently drawn frontally from the cassette 108 to extend forward of, out in front of, the distal end scooper 106a', wrap inwardly (in the direction of arrows A) and backwardly (in the direction of arrow B) through the scooper 106a', and then extend outwardly from the device. A knot 120 is formed with the tubing 109 for receiving waste 112 preferably and conveniently outside of the device and disposing of the waste 112 that is scooped up by the scooper.

Referring to an embodiment in FIG. 8, a waste scooper and disposal device 100' is provided comprising a film-dispensing or tubing-dispensing cassette scooper 108', as illustrated FIGS. 8 and 9. An inner annular wall 104 is elongated and configured to forwardly extend out (in the direction of arrow C) in front of the outer wall 124 of the cassette, such that the inner annular wall forms a waste entrance scooper 106a' opening at a point distal to the cassette for scooping up of waste 112. As illustrated in FIG. 9, the tubing is drawn out of the front of the cassette, in the direction of the arrow C, thence wrapped radially inwardly (as illustrated by arrows A), thereby wholly encasing the forwardly extending inner annular wall 104 with flexible tubing 109; and the tubing 109 is thence drawn backwardly (in the direction of arrow B) through the interior passageway 106 defined by the inner surface of the inner annular wall 104 and thence drawn outwardly out of the back of the cassette 108'.

A knot 120 is tied at the end of the tubing 109, to form a catch bag. In such embodiment, the forwardly extending inner annular wall scooper 106a' is configured to scoop up pet waste 112 while fully encased with flexible tubing 109 (e.g., plastic tubing) thereby obviating any direct contact between the waste 112 and the annular wall scooper 106a' itself, when a user slides such embodiment across a surface 122 to scoop up materials such as pet waste 112. Upon a user scooping up such pet waste 112, the waste 112 will fall backwardly (generally along the direction of the longitudinal axis of 104) into the catch bag (e.g., see 9 at FIG. 8); and the user can grasp and cinch the tubing and direct such tubing toward a cutting blade 116 (in similar nature to exemplary cutting blade 116 in FIG. 4) to cut off the tubing 109 to dispose of the pet waste 112. In such embodiment, the person's hand and the scooper tool 100' never come in contact with the pet waste 112, thereby obviating the need for cleaning the tool 100'. Accordingly, as disclosed, the forwardly extending inner annular wall scooper 106a' enables sanitary and convenient removal and disposal of pet waste 112.

In one embodiment, the housing of the waste scooper and disposal device also includes a blade 116 that is operatively connected to the housing for severing of tubing 109. Preferably, the outer annular wall 105 defines a sharp edge or blade 116 for severing the tubing 109 that extends from the waste exit opening 106b. In other words, the blade 116 is preferably integrated into the housing. The waste scooper and disposal 100 preferably includes an elongated pole 118 operatively connected to the handle 114 for maneuvering the scooper device across a ground surface 122 to scoop up waste 112 material while a user is in a standing position.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

The claimed invention is:

1. An animal waste removal and disposal device comprising:
    an elongated annular scooper body having an annular wall defining a passageway extending from a frontward waste entrance opening to a rearward waste exit opening of said scooper body, said rearward waste exit opening configured to receive and secure a pleated tubing dispensing cassette wherein said cassette has an annular cassette body defining an opening sized to closely surround and fit tightly against the annular wall of the waste exit opening; and
    a handle operatively connected to an outer surface of the elongated annular wall and configured to be grasped by a user's hand to maneuver said device to scoop up waste, wherein a portion of said scooper body forms a protective guard around at least a portion of said cassette to provide a barrier between said cassette and said waste when said device is maneuvered to scoop up waste from a surface.

2. The waste removal and disposal device of claim 1, wherein a said annular wall is characterized as having a length sufficient to extend fully through the opening of the annular cassette body to provide a protective barrier and slippery surface between the cassette and waste moving through the passageway and exiting the waste exit opening of the device.

3. The waste removal and disposal device of claim 1, further comprising an elongated pole operatively connected to the handle.

4. The waste removal and disposal device of claim 1, further comprising a row of tines extending forwardly from the annular scooper body at the waste entrance opening.

5. The waste removal and disposal device of claim 1, wherein said device is of unitary construction forged from a material selected from a group consisting of plastic, resin, high-density polyethylene, rubber, and steel.

6. The waste removal and disposal device of claim 1, wherein an outer periphery of the annular body as defined by the annular wall at the rearward waste exit opening has an outline geometrically similar to an outline of the opening of said cassette.

7. The waste removal and disposal device of claim 1, further comprising a pleated tubing dispensing cassette having an annular shape defining an opening therethrough, wherein said cassette comprises tubular film configured to be dispensed from said cassette by a user pulling one end of said tubular film.

8. An animal waste removal and disposal device comprising:
    an elongated annular scooper body having an annular wall defining a passageway extending from a frontward waste entrance opening to a rearward waste exit opening of said scooper body, said rearward waste exit opening configured to receive and secure a pleated tubing dispensing cassette wherein said cassette has an annular cassette body defining an opening sized to closely surround and fit tightly against the annular wall of the waste exit opening; and
    a handle operatively connected to an outer surface of the elongated annular wall and configured to be grasped by a user's hand to maneuver said device to scoop up waste, said annular wall of said waste exit opening further comprising a radially outwardly extending at least semi-annular wall transitioning to a rearwardly extending outer annular wall disposed concentric with and relative to the inner annular wall forming a U-shaped channel therebetween.

9. An animal waste removal and disposal device comprising:
an elongated annular scooper body having an annular wall defining a passageway extending from a frontward waste entrance opening to a rearward waste exit opening of said scooper body, said rearward waste exit opening configured to receive and secure a pleated tubing dispensing cassette wherein said cassette has an annular cassette body defining an opening sized to closely surround and fit tightly against the annular wall of the waste exit opening; and
a handle operatively connected to an outer surface of the elongated annular wall and configured to be grasped by a user's hand to maneuver said device to scoop up waste wherein said annular wall of said waste exit opening comprises a top portion relative to a bottom portion, wherein said top portion forms a rearwardly extending protrusion relative to the bottom portion to provide an open passageway within tubing extending rearwardly therefrom.

10. An animal waste removal and disposal device comprising:
an elongated annular scooper body having an annular wall defining a passageway extending from a frontward waste entrance opening to a rearward waste exit opening of said scooper body, said rearward waste exit opening configured to receive and secure a pleated tubing dispensing cassette wherein said cassette has an annular cassette body defining an opening sized to closely surround and fit tightly against the annular wall of the waste exit opening; and
a handle operatively connected to an outer surface of the elongated annular wall and configured to be grasped by a user's hand to maneuver said device to scoop up waste, said waste exit opening further comprising a radially outwardly extending at least semi-annular wall transitioning to a rearwardly extending outer annular wall comprising a blade for severing said tubing.

11. A material scooping device comprising:
an annular body configured to receive a tubing dispensing cassette, said body defining a passageway therethrough, said body having an upper surface opposite a lower surface, wherein said lower surface is configured as flat to slidingly engage an opposing external flat surface to scoop up material from said external surface;
a tubing dispensing cassette operatively connected to said annular body, said cassette comprising a length of pleated flexible tubing contained within said cassette;
a handle affixed to said annular body for maneuvering said body to scoop up said material, wherein said scooping device forms a protective guard around at least a portion of said tubing dispensing cassette to provide a barrier between said cassette and said material when said device is maneuvered to scoop up material from a surface.

12. The material scooping device of claim 11, further comprising an elongated pole operatively connected to the handle.

13. A material scooping device comprising:
an annular body configured to receive a tubing dispensing cassette, said body defining a passageway therethrough, said body having an upper surface opposite a lower surface, wherein said lower surface is configured as flat to slidingly engage an opposing external flat surface to scoop up material from said external surface;
a tubing dispensing cassette operatively connected to said annular body, said cassette comprising a length of pleated flexible tubing contained within said cassette;
a handle affixed to said annular body for maneuvering said body to scoop up said material; and
a blade for severing tubing.

14. A waste scooper and disposal device comprising:
a cassette for dispensing a flexible pleated tubing, said cassette comprising an annular body having a generally U-shaped housing, said housing further comprising a blade operatively connected thereto for severing of tubing, the annular body having an outer annular wall transitioning to a radially inwardly extending wall transitioning to an elongated inner annular wall, said elongated inner annular wall characterized as having a length sufficient to extend frontally from said housing to form a scooper at a distal end thereof, said scooper defining a waste entrance opening;
an annular flange operatively secured to the body to help retain pleated tubing in the U-shaped housing; and
a handle affixed to said cassette for maneuvering the device to scoop up said waste from a surface.

15. The waste scooper and disposal device of claim 14, further comprising pleated tubing within said cassette.

16. The waste scooper and disposal device of claim 14, further comprising pleated tubing within said cassette, wherein a portion of said tubing is sufficiently drawn frontally from said cassette to extend forward of said distal end scooper, wrap inwardly and backwardly through said scooper and thence extend outwardly from said device, where a knot is formed by said tubing for receiving and disposing of waste scooped up by said scooper.

17. The waste scooper and disposal device of claim 14, further comprising an elongated pole operatively connected to the handle for maneuvering said device across a ground surface while a user is in a standing position.

* * * * *